March 11, 1952   J. V. BOYLES   2,588,476
MACHINE FOR MAKING GARMENT HANGERS
Filed Dec. 30, 1947   8 Sheets-Sheet 2

Inventor
J. V. Boyles,
By
E.W. Anderson Co.
Attorneys

March 11, 1952  J. V. BOYLES  2,588,476
MACHINE FOR MAKING GARMENT HANGERS
Filed Dec. 30, 1947  8 Sheets-Sheet 3
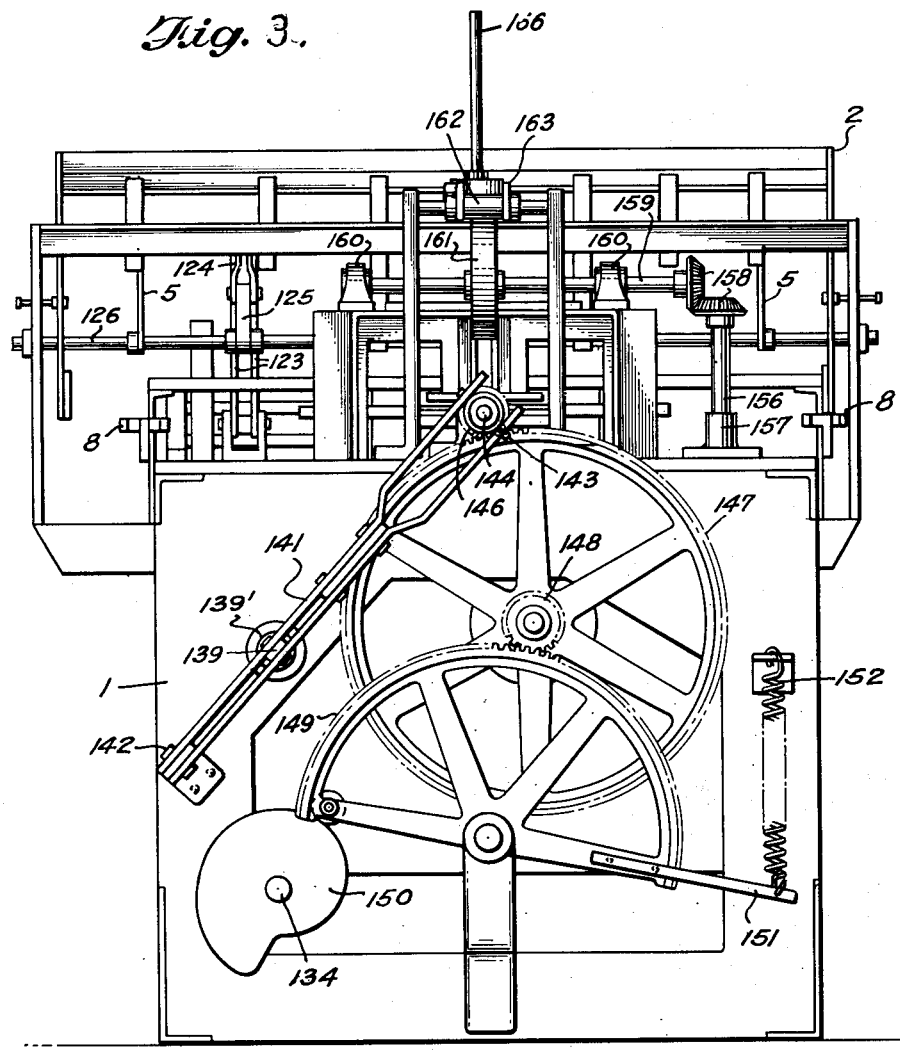
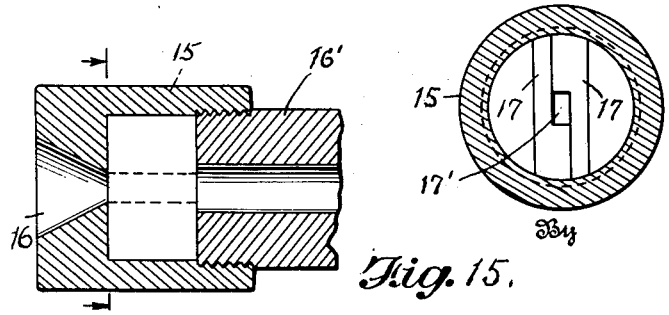
Inventor
J. V. Boyles,
E. W. Anderson & Son
Attorneys

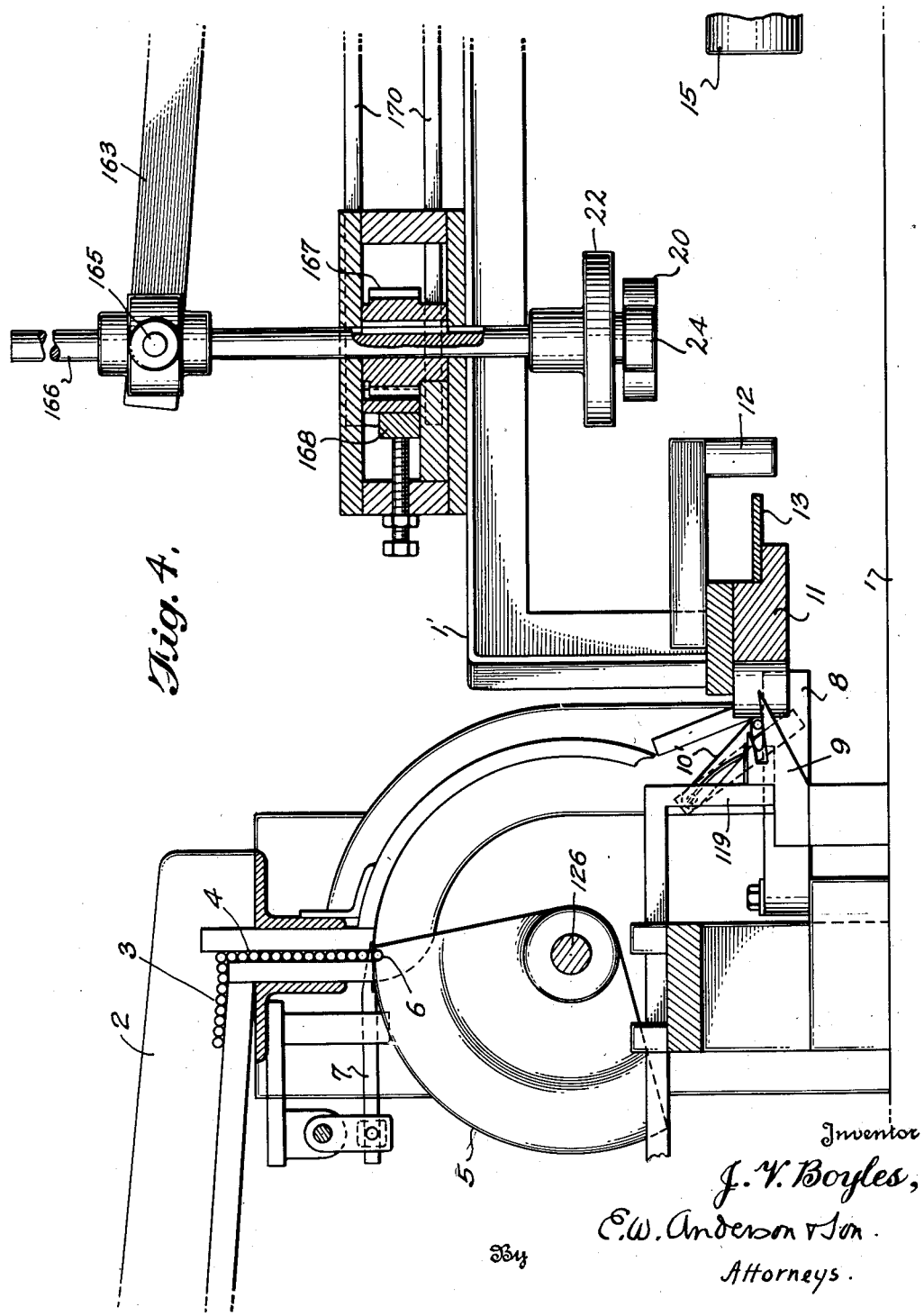

March 11, 1952 J. V. BOYLES 2,588,476
MACHINE FOR MAKING GARMENT HANGERS
Filed Dec. 30, 1947 8 Sheets-Sheet 5

Inventor
J. V. Boyles,
E.W. Anderson & Son.
By
Attorneys

March 11, 1952     J. V. BOYLES     2,588,476
MACHINE FOR MAKING GARMENT HANGERS
Filed Dec. 30, 1947     8 Sheets-Sheet 7

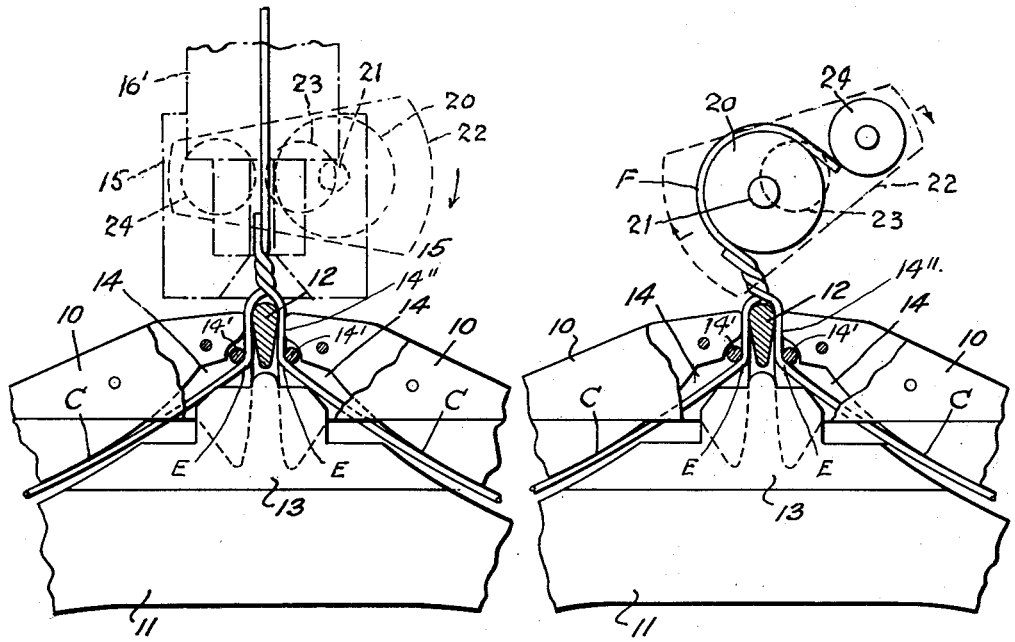
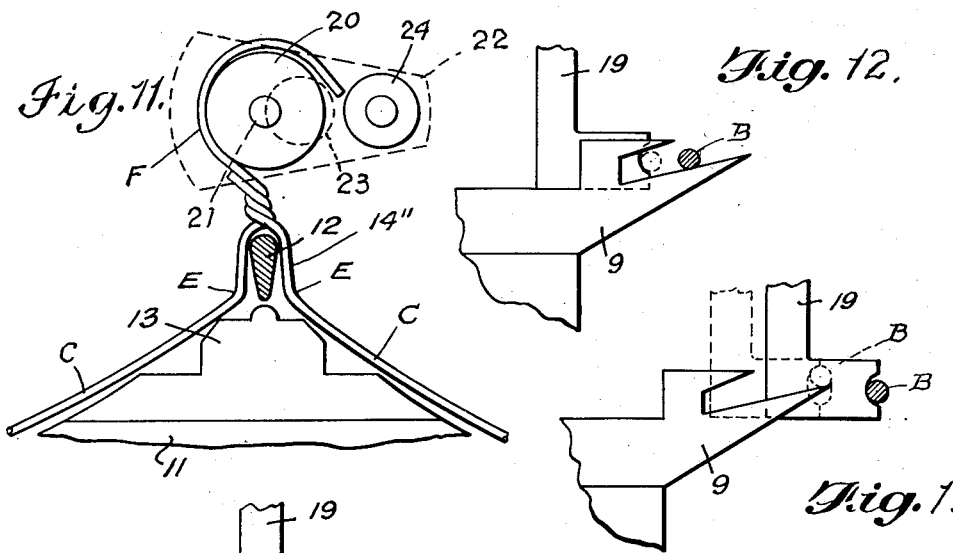
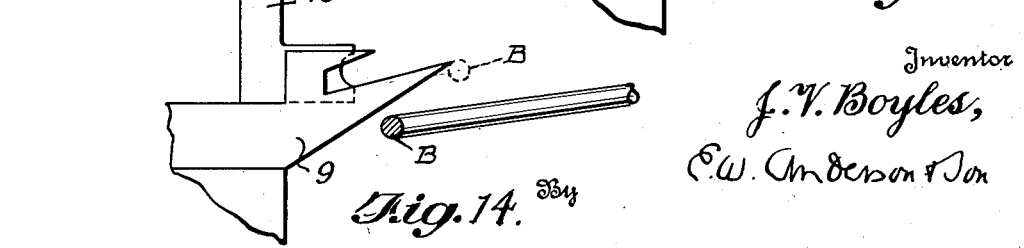

Patented Mar. 11, 1952

2,588,476

UNITED STATES PATENT OFFICE 2,588,476

MACHINE FOR MAKING GARMENT HANGERS

J. Van Boyles, High Point, N. C.

Application December 30, 1947, Serial No. 794,625

4 Claims. (Cl. 140—81.5)

The invention relates to machines for making conventional generally triangular garment hangers from straight wire blanks, an object being to provide such a machine wherein the completed hanger will be located in a horizontal plane and delivered by gravity without need for extraneous means for accomplishing such delivery, such for example as spring operated means for throwing the completed vertically positioned hanger from a support as disclosed in the patent to Kuester No. 1,550,824, dated August 25, 1925, or means for pushing the completed vertically positioned hanger from a support as disclosed in the patent to Baldwin No. 1,825,839, dated December 8, 1931. Another object is to provide improved means for feeding the wire blanks to the machine adapted to avoid tendency to feed more than one blank at a time, thereby avoiding mutilation of the hangers and consequent stoppage or jamming of the machine. Another object is to provide means for gently depositing the wire blanks in position with respect to the wire bending levers so as to avoid tendency of the blanks to bound upwardly out of position due to the speed of deposit being too great, this also avoiding mutilation of the hangers and consequent stoppage or jamming of the machine. Other objects and advantages will appear hereinafter or will be obvious.

The invention consists in the novel construction and combinations of parts as hereinafter set forth in the claims.

In the accompanying drawings illustrating the invention,

Figure 3 is a right end view of the machine as shown in Fig. 1.

Figure 4 is a detail vertical sectional view of the machine, showing the feeding means for the blanks and the hook forming head in raised position.

Figure 9 is a detail fragmentary plan view, showing the wire bending levers closed to the fixed form and the hook forming head in its No. 1 or initial position.

Figure 10 is a view similar to Fig. 9, showing the hook forming head in its No. 2 position.

Figure 11 is a view similar to Fig. 10, showing the hook forming head in its No. 3 or final position.

Figure 12 is a detail fragmentary side view, showing the center rest for the hanger blank, said blank being shown in section in full lines in its No. 1 or initial position and in dotted lines in its No. 2 position.

Figure 13 is a view similar to Fig. 12, showing the base bar of the hanger pushed by the slides to the position shown in Fig. 7.

Figure 14 is a view similar to Fig. 12, showing the base bar of the hanger in released position, being the position assumed when the hanger is ready to be delivered by gravity.

Figure 15 is a detail longitudinal sectional view of the twister head.

Figure 16 is a section on the line 16—16 of Fig. 15.

Figure 1:
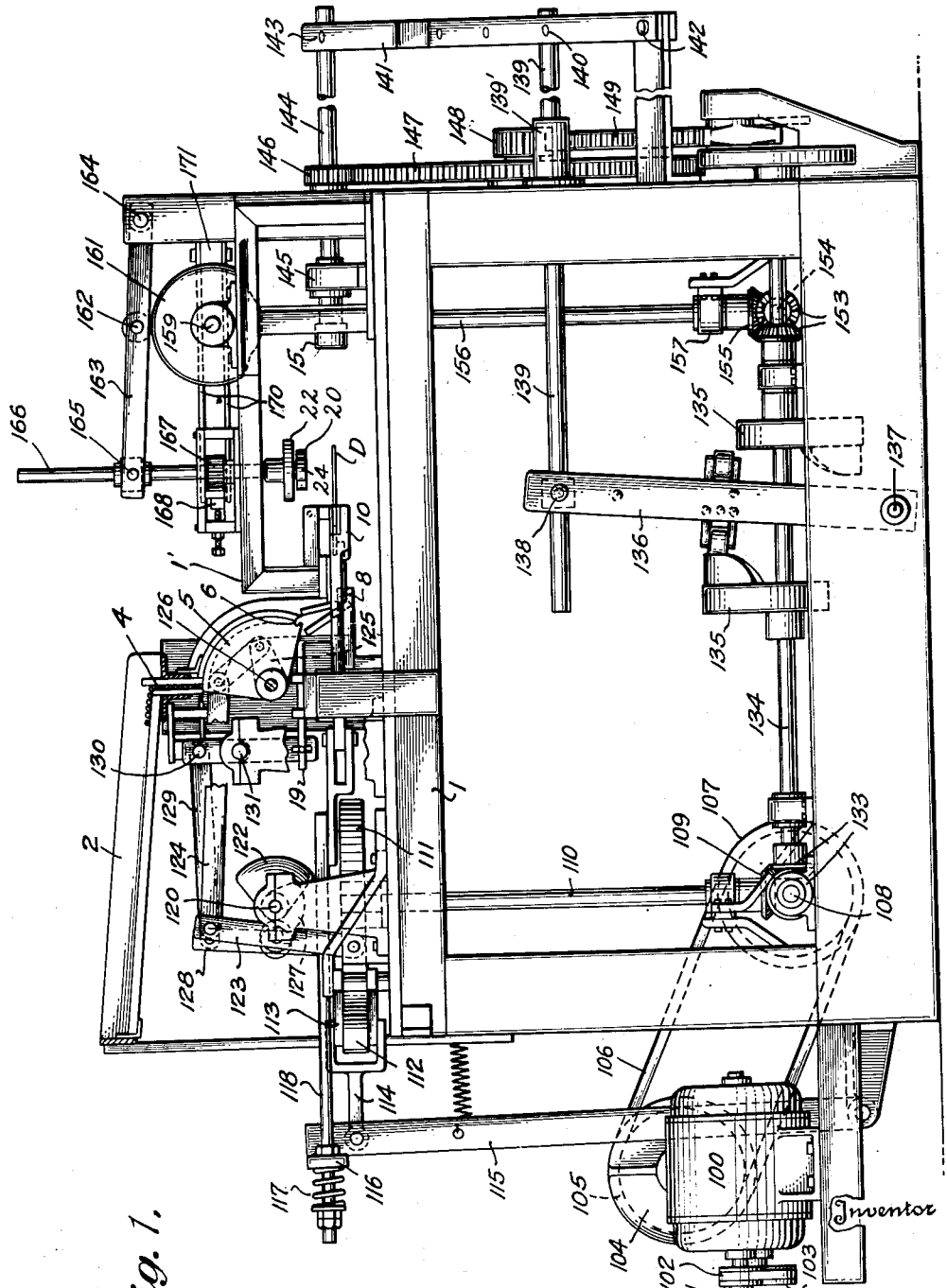
Figure 1 is a side view of the machine, parts being broken away.
Figure 2:
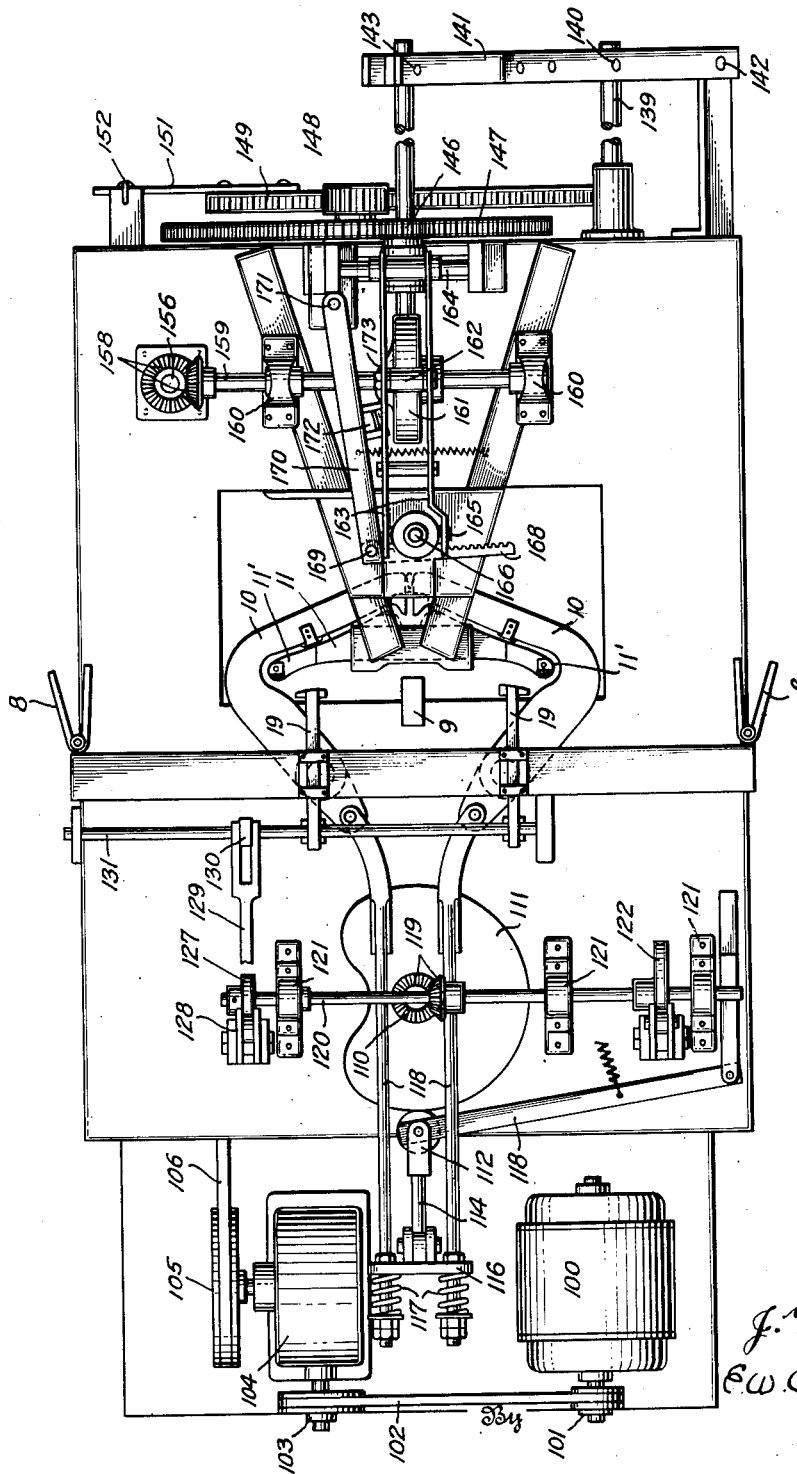
Figure 2 is a plan view of the machine with certain parts removed.
Figure 5:
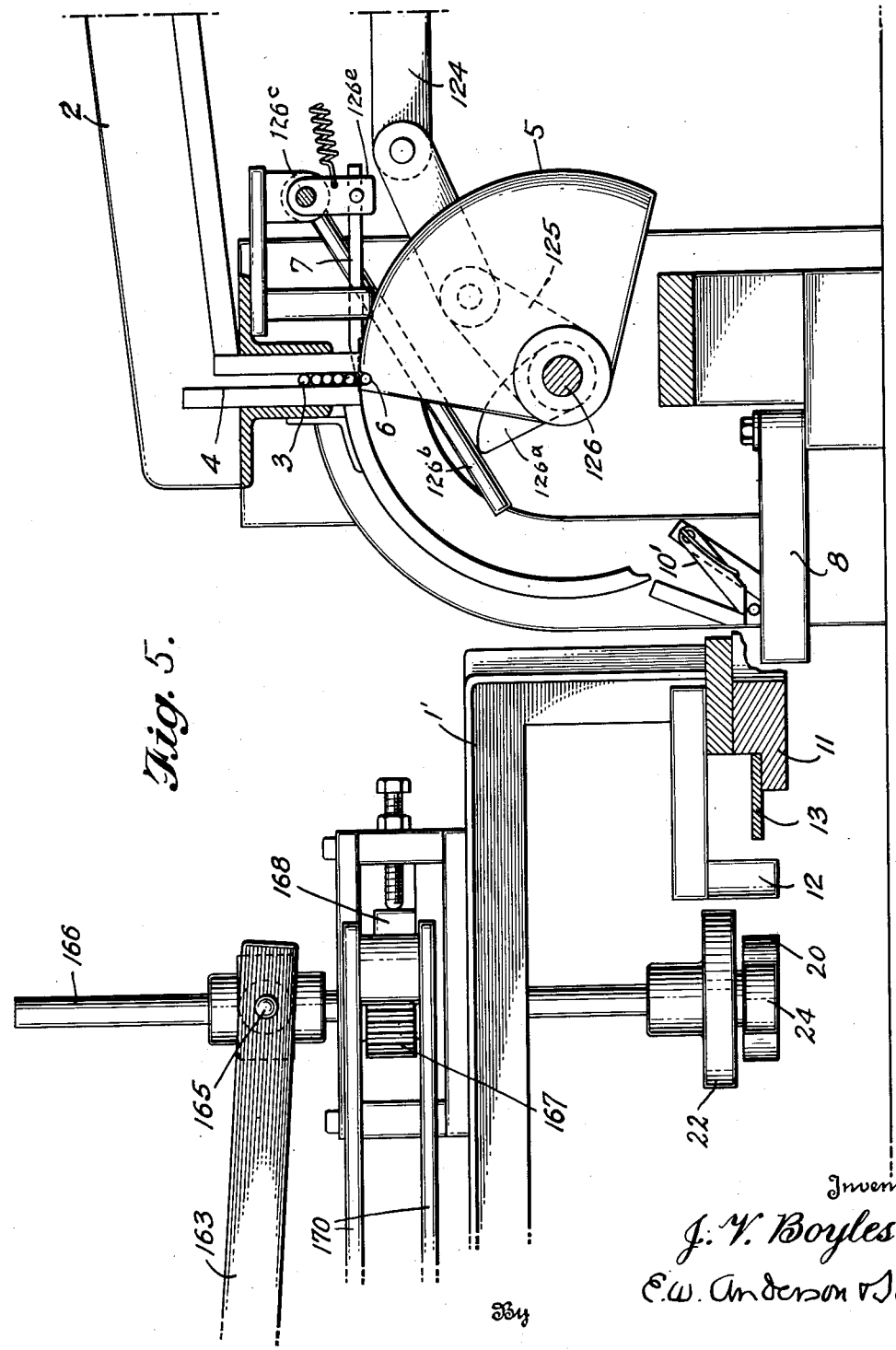
Figure 5 is a view similar to Fig. 4, looking from the opposite direction, showing the hook forming head in lowered position.

In these drawings, the numeral 1 designates the stationary framing of the machine, having an inclined table 2 for the straight blanks 3 of spring-metal wire, previously cut to the proper length and fed along said table by gravity into a vertical slot 4 of said table containing a vertical stack of said blanks.

An oscillatory quadrant 5, one of which is provided at each side of the machine has a notch 6, positioned to receive the lowermost blank of said stack. A reciprocatory finger device 7 works between the two lowermost blanks of said stack to press said lowermost blank home within said notch and to prevent more than one blank at a time being fed to the said notch.

The quadrants 5 deliver the blanks successively to horizontal end rests 8 and a center rest 9, by gravity, and in order to deposit the blanks gently upon these rests 8 and 9, the blanks fall upon an inclined spring-upheld deflector 10′, which is displaced by the weight of the blank and springs back to normal position to receive the succeeding blank, and over the deposited blank to prevent its rise. The end rests 8 may be magnets to reduce to a minimum the bounce of the blanks as they fall and to retain the blanks in position as deposited.

Figure 6:
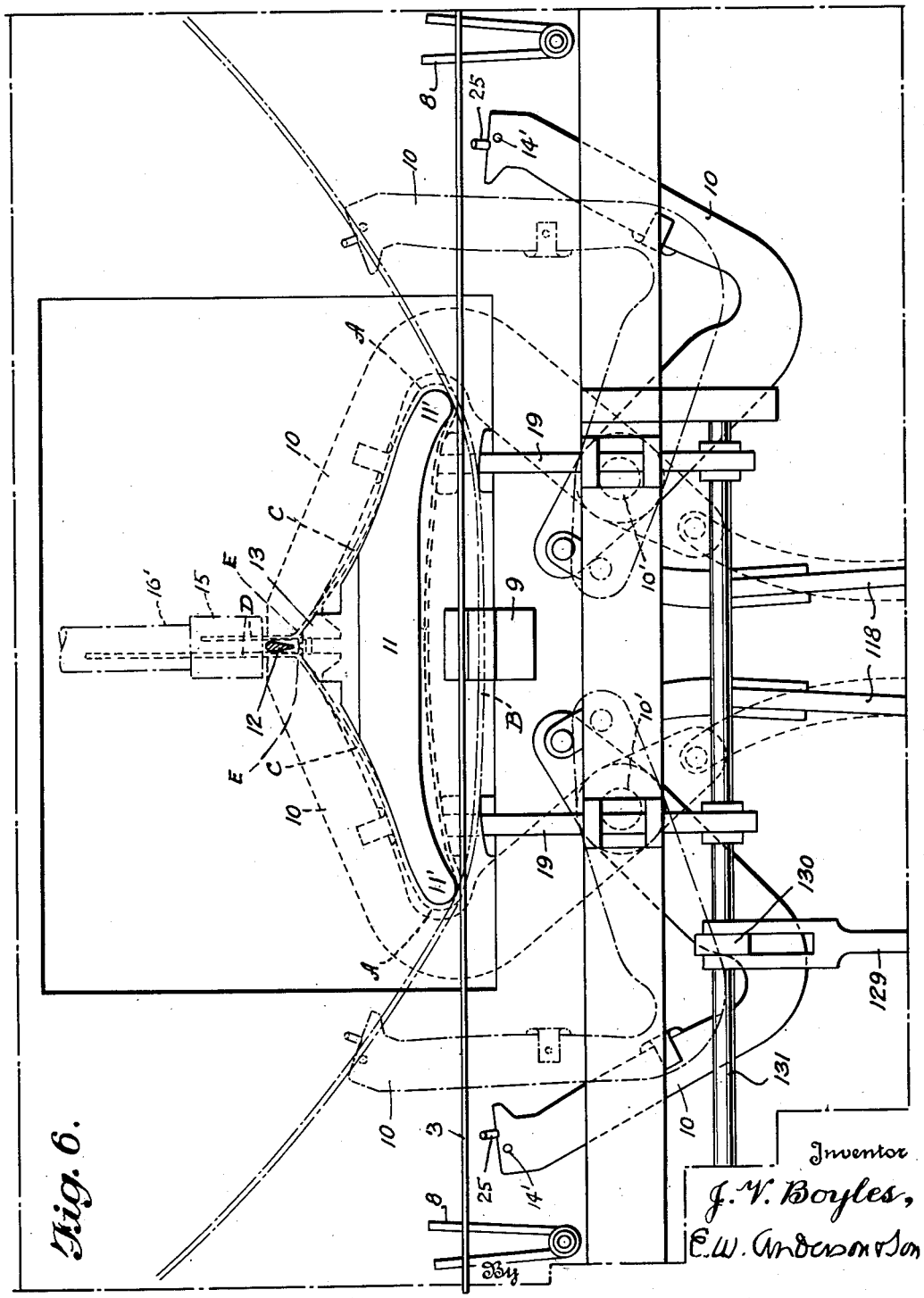
Figure 6 is an enlarged detail plan view of a portion of the machine with parts removed to show the operation of the wire bending levers, different positions of the parts being shown in dotted lines.

A fixed form 11 of generally triangular form comprising horizontally disposed base corners 11', an apex blade 13 and an apex post 12 depends from the superstructure 1' of the fixed frame 1 of the machine. As each wire blank is deposited upon the horizontal rests or supports 8 and 9, horizontally reciprocatory wire bending levers 10 are operated to bend the wire blank about said base corners 11' and against said apex blade 13 and apex post 12 as shown in Figure 6 to make a generally triangular hanger having base angles A, a base bar B, side bars C, parallel wire end portions D one of which is longer than the other, and bends E at the roots of said wire end portions, said base bar being outwardly bowed as shown in dot and dash lines Figure 6. The base corners 11', apex blade 13 and apex post 12 of said fixed form 11 are positioned similarly to the angles of the generally triangular hanger. The wire bending levers 10 have notches 14 in their free end portions and studs 14' within said notches cooperating with apex blade 13 and apex post 12, said blade entering within said notches as shown in Figures 9 and 10. The hanger so made is located in a horizontal plane. It is obvious that it is within the spirit of the invention to vary the form of the apex blade 13 and of the notches 14 as disclosed in the patent to Boyles No. 1,941,430, dated December 26, 1933, wherein the apex blade is designated 38 and the notches are designated 16.

Means for twisting the wire end portions D together to form the neck of the hanger comprise twister head 15, which upon one reciprocatory stroke thereof engages these parallel end portions and upon the reverse stroke is disengaged therefrom following rotation of the twister head to accomplish the twisting. In this twisting of the wire end portions D together to form the hanger neck, the twister head twists the wire end portions against the apex post 12 as an abutment to form a tight twist which would otherwise be lacking as it is not practicable to form it in any other way. There is also formed during this twisting a V bend 14'' straddling said post and joining the said neck to the side bars C of the hanger. The twister head 15 is provided with a tapered entrance opening 16 for the wires, die plates 17 within the cavity of the hollow head being notched at 17' to provide an aperture to receive the wires and jaws to tightly grip the wires, and in order to center these jaws the twister head has screw engagement with its shaft 16', whereby as said head is screwed home upon said shaft, the outer ends of the die plates 17 will be engaged by the side wall of the cavity of the head to center the jaws.

During the operation of the twister head, horizontally reciprocatory slides 19 are operated to engage the base bar B of the hanger and convert the outward bow thereof into an inward bow, as shown in dotted lines in Figure 6, in order to complete the bending of the base angles A of the hanger and for a further purpose to be described.

Figure 7:
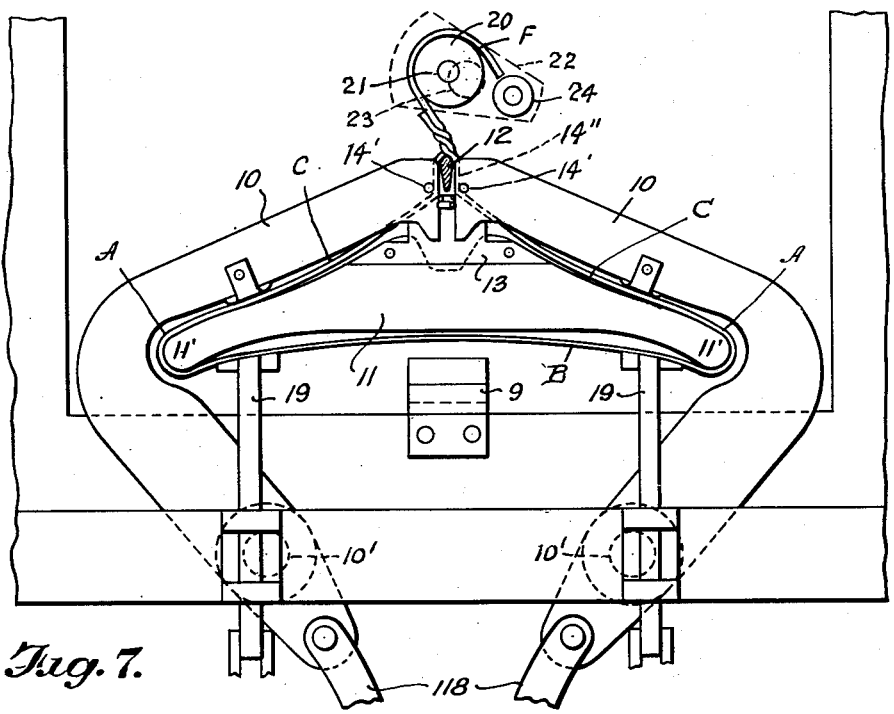
Figure 7 is a view similar to Fig. 6, showing the wire bending levers completely closed to the triangular form in full lines, and showing the neck of the hanger twisted and the hook forming head, in its final position.
Figure 8:
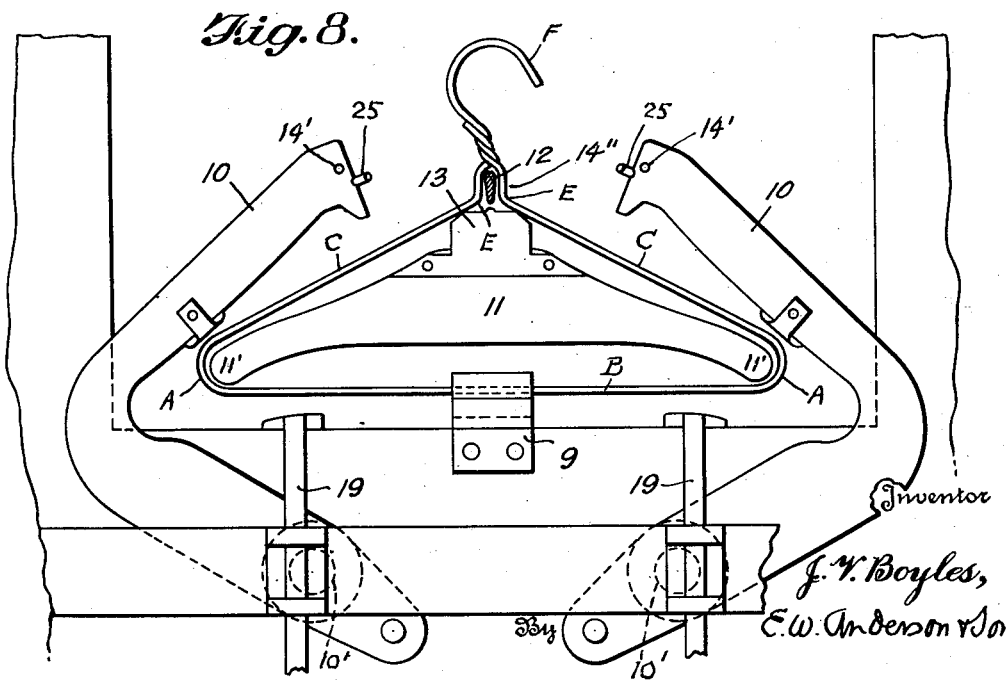
Figure 8 is a view similar to Fig. 7, showing the wire bending levers partially retracted and the slides retracted to release the hanger.

The wire bending levers 10 are of V-form and have their fulcrums 10' spaced horizontally from and closer together than the base corners 11' of said fixed form 11, the angle of the V of the levers being in closed position of the levers to said form 11 located adjacent said base corners 11', as shown in Figure 7. Upon initial retraction of said levers the completed hanger, which through inherent resilience will retract from said base corners 11', apex blade 13 and apex post 12 of said fixed form, will have nothing to interfere with its delivery by gravity other than center support 9, inasmuch as said form 11 depends from the superstructure 1' of the fixed frame 1 of the machine and the hook forming means also depends from said superstructure.

The center rest or support 9 for the wire blanks is horizontally spaced from said fixed form 11 and has a slight upward incline and a free end portion reduced to a thin edge, said slides 19 operating to push the base bar B of the hanger up said incline to tension said base bar and cause it to snap over said thin edge and pass thereunder in the straightening of said base bar due to its inherent resilience, thus enabling said base bar to fall in said gravity delivery, see Figures 12, 13 and 14.

In the operation of the machine, the motor 100 drives pulley 101, belted at 102 to pulley 103, thus driving reduction gears 104, 105, belted at 106 to pulley 107, on shaft 108, said shaft driving vertical shaft 110 through the medium of bevel gears 109, said shaft 110 having cam 111 fast thereon, said cam operating the wire bending levers 10 through the medium of roller 112 on lever 113, the shaft of said roller having link connection 114 with a lever 115. The lever 115 has a cross head 116 having resilient operating connection 117, 118 with said wire bending levers 10, said resilient connection being yieldable in case of jamming of the machine to thereby avoid mutilation of the parts. The vertical shaft 110 has bevel gear connection 119 to transverse shaft 120 mounted in bearings 121 of the stationary main frame, said shaft 120 having at one end thereof a cam 122 operating a lever 123, said lever having link connection 124 with a lever 125 fixed to a transverse shaft 126, the latter having the quadrants 5 fast thereon.

In order to operate the finger device 7, a cam 126a is fast to the shaft 126 and operates a lever 126b, which latter is fast to a shaft 126c, and the shaft 126c is mounted in bearings of the stationary frame 1. A depending arm 126e is also fixed to the shaft 126c and has pin connection with the finger device 7.

At the other end of the shaft 120 is a cam 127 which operates a lever 128 having link connection 129 with a lever 130 fast to a transverse shaft 131, said lever 131 having a depending arm 132 which operates the slides 19.

At one end of the transverse shaft 108 is a bevel gear connection 133 with a horizontal shaft 134 having alternately working cams 135.

A lever 136, fulcrumed at 137, has operating connection 138 with one end of a reciprocatory shaft 139 having bearings 139' in the stationary frame 1, said shaft 139 having operating connection 140 with a lever 141, fulcrumed at 142, the other end of said shaft 139 having operating connection 143 with the reciprocatory shaft 144 of the twister head 15, to move said twister head into and out of engagement with the parallel end portions D of the wires, said shaft 144 having bearings 145 in the stationary frame 1. A pinion 146 has feathered connection with said shaft 144, thereby allowing shaft 144 to reciprocate therethrough.

The pinion 146 meshes with gears 147 which latter include a pinion 148 meshing with a segmental gear 149, the latter being driven through the medium of a cam 150 mounted on one end of the horizontal shaft 134 to rotate the twister head.

The drive gear 149 has a radial arm 151 fast thereto, said arm having a spring connection 152 with the stationary frame 1, so that in case the twister head should become jammed, there will be no mutilation of the parts.

The horizontal shaft 134 has bevel gear connection 153 with a transverse shaft 154 mounted in bearings of the frame 1. This transverse shaft 154 has bevel gear connection 155 with a vertical shaft 156, the latter extending through bearings 157 of the frame 1, and at its upper end said shaft 156 is provided with a bevel gear connection 158 with a transverse shaft 159 mounted in bearings 160 of the frame 1.

The shaft 159 is provided with a cam 161 operating a roller 162 carried by a lever 163 fulcrumed at 164, said lever 163 operating swivel connection 165 with the vertically reciprocatory shaft 166 the lower end of which carries the hook forming head to be described. Shaft 166 has feathered connection with a pinion 167 suitably mounted on the superstructure 1' of the frame 1 to prevent it from reciprocating with shaft 166. The pinion 167 meshes with rack 168 connected at 169 with a lever 170 fulcrumed at 171. The lever 170 has a roller 172 contacting a cam 173, which cam forms a lateral extension of the cam 161. Cam 161 operates lever 163 to raise it, said lever being lowered by gravity, thus accomplishing the reciprocation of shaft 166. Cam 173 operates lever 170 and rack 168 to rotate pinion 167 and thus rotate the hook forming head.

The lever 170 has a retracting spring connection 173 with the frame 1 to retract the hook forming head, said spring connection being yieldable to prevent mutilation of the parts in case of jamming.

The hook forming head 22 is fixed on vertically reciprocatory shaft 166 and is provided with a roller 20 journaled thereon at 21 eccentrically of shaft 166, and with another roller 24 journaled thereon at 24' eccentrically of and upon the opposite side of shaft 166 from journal 21. Rollers 20 and 24 are spaced apart and are adapted to receive between them the terminal portion of the longer of the wire end portions D of the hanger. Upon operation of said hook forming head, said terminal portion of the longer wire end portion will be engaged by both rollers 20 and 24 and wrapped around roller 20 to form the hook of the hanger as shown in Figures 9, 10 and 11. Roller 24 will escape from the free end of the hook at the finish of this operation, as shown in Fig. 11. As the wire bending levers 10 are closed to the form 11, guide studs 25 located at the free ends of said levers are adapted to engage the end portions of the wire blank and straighten the blank should this be necessary due to a crooked blank.

I claim:

1. A machine for making conventional generally triangular garment hangers from straight wire blanks, comprising a fixed form depending from the fixed frame of the machine, said form comprising horizontally disposed base corners, an apex blade and an apex post positioned similarly to the angles of the hanger, a fixed horizontal support located midway between said base corners and horizontally spaced from said fixed form, means for feeding the wire blanks successively upon said support, twin horizontally reciprocatory levers for bending the wire blanks about said base corners and against said apex blade and said apex post to make a hanger located in a horizontal plane having wire end portions one of which is longer than the other, horizontally reciprocatory slides engaging the base bar of said hanger for completing the bending of the base angles of said hanger about said base corners of the fixed form, means for twisting said wire end portions together to make the hanger neck and a V-bend straddling said apex post and connecting said neck with the side bars of the hanger, and means comprising a hook forming head for bending the terminal portion of the longer of said wire end portions into a hook, said levers having their fulcrums spaced horizontally from said base corners of the fixed form and upon retraction releasing the hanger from said fixed form for delivery by gravity, said hook forming head depending from the fixed frame of the machine to enable the hook to fall in said gravity delivery, said slides operating to push the base bar of the hanger over and beyond said support to free it therefrom and enable said base bar to fall in said gravity delivery.

2. A machine for making conventional generally triangular garment hangers from straight wire blanks, comprising a fixed form depending from the fixed frame of the machine, said form comprising horizontally disposed base corners, an apex blade and an apex post positioned similarly to the angles of the hanger, a fixed horizontal support located midway between said base corners and horizontally spaced from said fixed form, means for feeding the wire blanks successively upon said support, twin horizontally reciprocatory levers for bending the wire blanks about said base corners and against said apex blade and said apex post to make a hanger located in a horizontal plane having wire end portions one of which is longer than the other, horizontally reciprocatory slides engaging the base bar of the hanger for completing the bending of the base angles of the hanger about said base corners of the fixed form, means for twisting said wire end portions together to make the hanger neck and a V-bend straddling said apex post and connecting said neck with the side bars of the hanger, and means comprising a hook forming head for bending the terminal portion of the longer of said wire end portions into a hook, said levers having their fulcrums spaced horizontally from the base corners of said fixed form and upon retraction releasing the hanger from said fixed form for delivery by gravity, said hook forming head depending from the fixed frame of the machine to enable the hook to fall in said gravity delivery, said support having a slight upward incline and a free end portion having a reduced thin edge, said slides operating to push the base bar of the hanger up said incline to tension said base bar and cause it to snap over said thin edge to free it therefrom and enable the base bar to fall in said gravity delivery.

3. A machine for making conventional generally triangular garment hangers from straight wire blanks, comprising a fixed form depending from the fixed frame of the machine, said form comprising horizontally disposed base corners, an apex blade and an apex post positioned similarly to the angles of said hanger, a fixed horizontal support located midway between said base corners and horizontally spaced from said fixed form, means for feeding the wire blanks successively upon said support, twin horizontally reciprocatory levers for bending the wire blanks about said base corners and against said apex blade and said apex post to make a hanger located in a horizontal plane having parallel wire end portions one of which is longer than the other, horizontally reciprocatory slides engaging the base bar of the hanger for completing the bending of its base angles about the base corners of said fixed form, means for twisting said wire end portions together to make the hanger neck and a V-bend straddling said apex post and connecting said neck with the side bars of the hanger, and means comprising a hook forming head for bending the terminal portion of the longer of said wire end portions into a hook, said levers having their fulcrums spaced horizontally from the base corners of said fixed form and upon retraction releasing the hanger from said fixed form for delivery by gravity, said hook forming head depending from the fixed frame of the machine to enable the hook to fall in said gravity delivery, said slides operating to push the base bar of the hanger over and beyond said support to free it therefrom and enable said base bar to fall in said gravity delivery, said blank feeding means comprising an oscillatory quadrant the arcuate edge portion of which is provided with a notch to receive the lowermost of a vertical stack of blanks and a reciprocatory finger tangent to said arcuate edge and working between the two lowermost of the blanks in said stack to prevent more than one blank at a time being fed to said notch and to press the lowermost blank of said stack home within said notch.

4. A machine for making conventional generally triangular garment hangers from straight wire blanks, comprising a fixed form depending from the fixed frame of the machine, said form comprising horizontally disposed base corners, an apex blade and an apex post positioned similarly to the angles of said hanger, a fixed horizontal support located midway between said base corners and horizontally spaced from said fixed form, means for feeding the wire blanks successively upon said support, twin horizontally reciprocatory levers for bending the wire blanks about said base corners and against said apex blade and said apex post to make a hanger located in a horizontal plane having parallel wire end portions one of which is longer than the other, horizontally reciprocatory slides engaging the base bar of the hanger for completing the bending of its base angles about the base corners of said fixed form, means for twisting said wire end portions together to make the hanger neck and a V-bend straddling said post and connecting said neck with the side bars of the hanger, means comprising a hook forming head for bending the terminal portion of the longer of said wire end portions into a hook, said levers having their fulcrums spaced horizontally from the base corners of said fixed form and upon retraction releasing the hanger from said form for delivery by gravity, said hook forming head depending from the fixed frame of the machine to enable the hook to fall in said gravity delivery, said slides operating to push the base bar of the hanger over and beyond said support to free it therefrom and enable said base bar to fall in said gravity delivery and an inclined spring-upheld deflector upon which the wire blanks are successively deposited by said blank feeding means, said deflector being yieldable against the tension of its spring by the weight of the blank to reduce the speed of the fall of the blank and to deposit the blank gently upon said support, said deflector being restorable to normal position by its spring to receive the next succeeding blank and to position it over the deposited blank to prevent rise of the latter out of position.

J. VAN BOYLES.

REFERENCES CITED

The following references are of record in the file of this patent:

UNITED STATES PATENTS

| Number | Name | Date |
|---|---|---|
| 1,550,824 | Kuester | Apr. 25, 1925 |
| 1,616,452 | Knable | Feb. 8, 1927 |
| 1,695,603 | Magidson | Dec. 18, 1928 |
| 1,835,839 | Baldwin | Dec. 8, 1931 |
| 2,041,805 | Backer | May 26, 1936 |
| 2,074,789 | Hopkins | Mar. 23, 1937 |
| 2,162,669 | Boyles | June 13, 1939 |